Oct. 22, 1963
W. C. PROUT
3,107,358
PROSTHETIC JOINT
Filed May 15, 1961
2 Sheets-Sheet 1
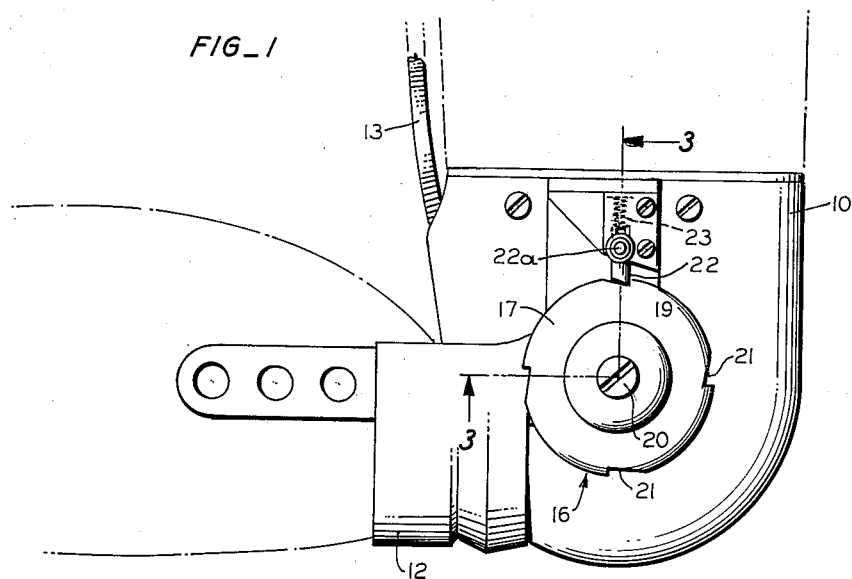
FIG_1
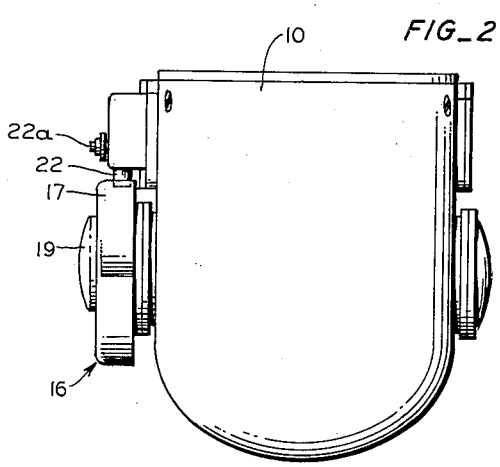
FIG_2
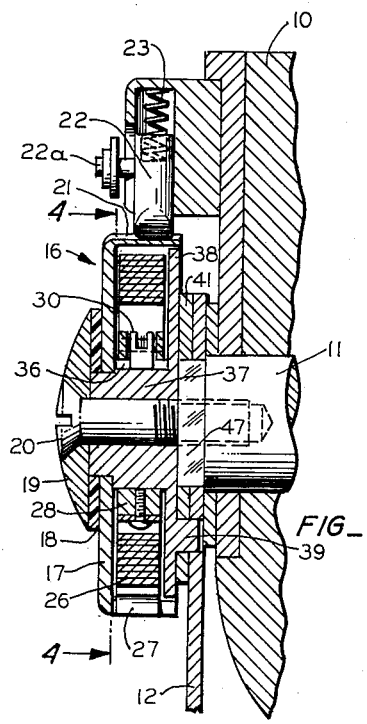
FIG_3
INVENTOR.
WESLEY C. PROUT
BY
ATTORNEYS Oct. 22, 1963  W. C. PROUT  3,107,358
PROSTHETIC JOINT
Filed May 15, 1961  2 Sheets-Sheet 2
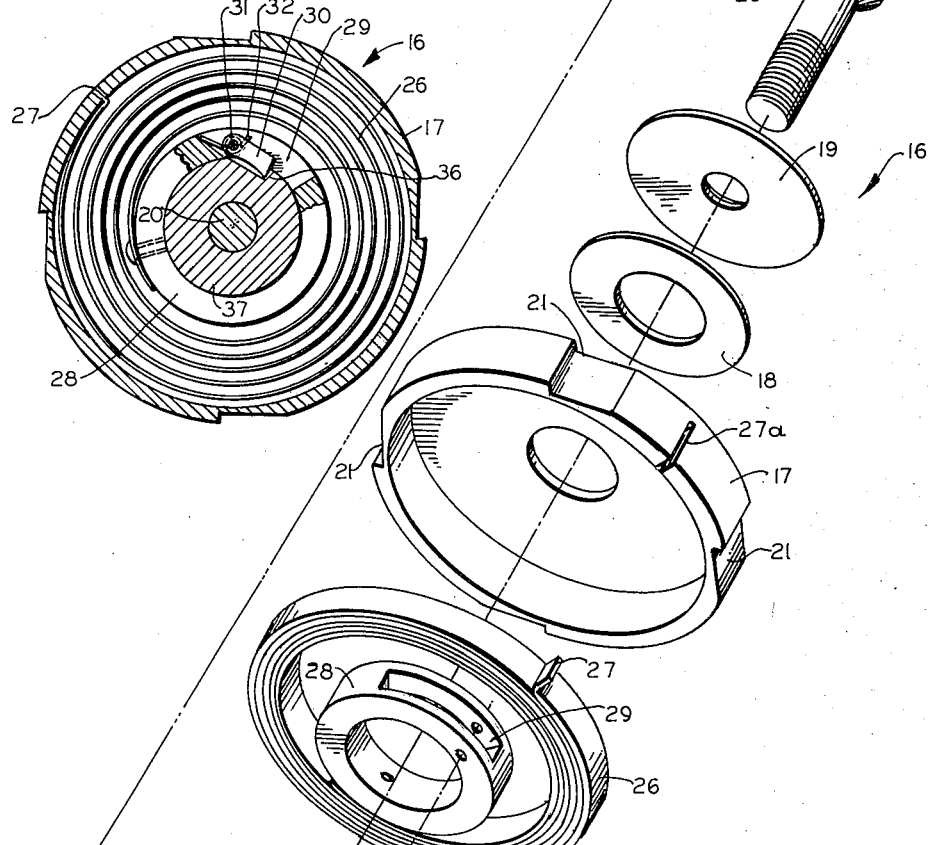
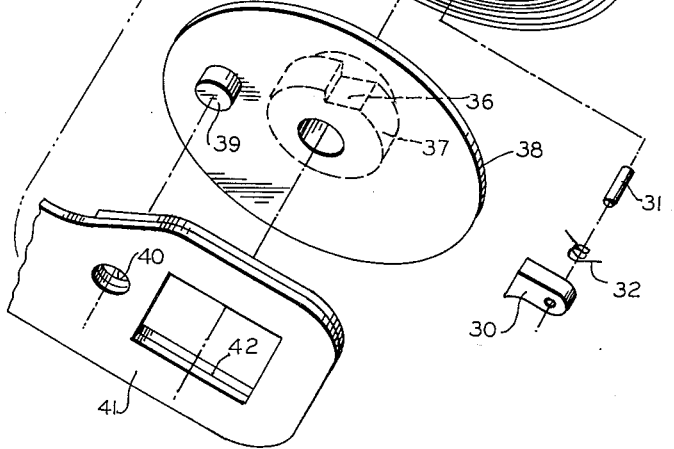
INVENTOR.
WESLEY C. PROUT
BY
ATTORNEYS

United States Patent Office 3,107,358
Patented Oct. 22, 1963

3,107,358
PROSTHETIC JOINT
Wesley C. Prout, Los Gatos, Calif., assignor to A. J. Hosmer Corporation, San Jose, Calif., a corporation of California
Filed May 15, 1961, Ser. No. 110,020
3 Claims. (Cl. 3—12.2)

The present invention relates to prosthetic joints such as elbow joints, for example, incorporating counter-balancing means such as a spring for partially or wholly supporting the weight of the forearm portion of the joint, and is concerned more particularly with an improved safety mechanism to prevent breaking of the spring upon complete release of the spring tension so as to permit free unwinding thereof.

It is a general object of the invention to provide an improved prosthetic joint such as an elbow joint, incorporating a counter-balancing spring which is not likely to become broken or damaged in use or in repair work.

A further object of the invention is to provide a prosthetic joint of the above character in which the counter-balancing spring is connected to one of its retaining members at one end thereof by means of a one-way drive connection installed to release or slip in the direction of unwinding the spring.

Other objects and advantages of the invention will be apparent from the following description of a preferred embodiment thereof, taken in connection with the accompanying drawings, in which:

FIG. 1 is a side elevational view of a prosthetic elbow joint embodying the improved counter-balancing means of the instant invention;

FIG. 2 is another side elevational view of the counter-balancing spring mechanism as viewed from the right of FIG. 1;

FIG. 3 is a sectional view through the counter-balancing means taken as indicated by the line 3—3 in FIG. 1;

FIG. 4 is a sectional view, partially in elevation, taken as indicated by the line 4—4 in FIG. 3;

FIG. 5 is an exploded perspective view of the component parts of the counter-balancing spring mechanism.

Referring to the drawings, and particularly FIGS. 1 through 3 thereof, the elbow joint of the present invention includes an upper arm part 10, having a hinge connection in a conventional manner about a pin 11 with a forearm part 12. The elbow joint includes the conventional cable means 13 for locking and unlocking the joint and connected to the shoulder harness of the wearer.

A spring counter-balancing mechanism 16 is provided for the forearm 12 comprising an outer cup-shaped casing 17, which is freely rotatable about a hub 37 of a plate 38, later described. The casing 17 is held in place by a flat washer 18, a formed washer 19 and a screw 20 threaded into the pivot shaft 11. The casing 17 is provided with a series of one-way latch recesses 21, which, as seen in FIG. 1, can be engaged by a latching dog 22 having a handle 22a and urged by spring 23 into engagement with the periphery of the cylindrical casing 17 to connect the casing to the upper arm 10. Inside the casing 17 there is provided a coil spring 26 which has its outer end bent at 27 to seat in a transverse slot 27a in the casing 17 and anchor the outer spring end in position. The inner end of the spring is fastened by a screw or other suitable fastening means to a dog collar 28, which is slotted at 29 to receive a latching dog 30 which is pivotally mounted about a pin 31 and is urged in a clockwise direction by a spring 32 to engagement with a one-way latching notch 36 in the hub 37. The hub 37 has integrally formed therewith a plate 38 which carries a pin 39 seating in an aperture 40 in the hinge part 41 of the forearm 12. The hinge part 41 has a square aperture 42 seating over a square portion 47 of pivot shaft 11 so that the plate 38 and the hub 37 move with the forearm.

The latch recesses 21 have their latch faces positioned in a direction to resist counter-clockwise movement of the casing 17 but to permit a clockwise movement thereof from latching recess to latching recess in tightening the spring and adjusting the spring to the particular arm and wearer. The spring is so disposed in the casing 17 so as to resist lowering movement of the forearm to a desired degree and thereby aid the wearer in the use of the arm.

In repairing and servicing prosthetic joints of the above character, workmen are not always careful and often will release the latching dog 22 and permit free turning of the casing 17 during unwinding of the spring 26. After such unwinding, the dog 30 is free to ride out of its latching notch and to rotate freely. For example, upon release of the dog 22, the casing 17 rotates counter-clockwise and the dog 30 remains in its notch due to the clockwise force which is applied by the inner end of the spring to the collar 28. However, the dog 30 is free to move out of its notch upon release of the clockwise force applied to the collar 28 when the spring 26 is completely unwound. At this time the momentum of the casing 17 carries the spring beyond its unwound condition and the dog 30 is then released and permits free rotation of the spring with respect to the forearm. In other words, in effect a one-way clutch is provided between the inner end of the spring and the forearm so that if unintentionally the spring is fully released by unlatching of the casing, the entire spring is free to revolve with the casing with reference to the forearm.

While I have shown and described a preferred form of the invention, it is apparent that the invention is capable of modification and variation from the form shown so that the scope thereof should be limited only by the proper scope of the claims appended hereto.

What I claim is:

1. In a prosthetic elbow, an upper arm portion and a forearm portion, a pivotal connection between said arm portions, a counter-balancing spring mechanism connected respectively to said upper arm portion and said forearm portion for movement about the axis of said pivotal connection and including a spring, said spring mechanism including a hub member connected to said forearm portion and a casing member connected to said upper arm portion, the outer end of said spring being connected to said casing member, and the inner end of said spring having a one-way releasable drive connection with said hub member and positioned to resist unwinding of said spring with reference to said forearm portion, latch means on said upper arm portion for holding the casing member against movement, under the influence of said spring, said one-way releasable connection between said hub member and said spring permitting free rotation of the inner end of said spring upon release of said latch means.

2. In a prosthetic elbow, an upper arm portion and a forearm portion, a pivotal connection between said arm portions, a counter-balancing spring mechanism connected respectively to said upper arm portion and said forearm portion for movement about the axis of said pivotal connection and including a spring, said spring mechanism including a hub member connected to said forearm portion and a casing member connected to said upper arm portion, the outer end of said spring being connected to said casing member, and the inner end of said spring having a one-way releasable drive connection with said hub member and positioned to resist unwinding of said spring with reference to said forearm portion, said releasable drive connection comprises a one-way latching notch in said hub member, a collar journaled about said hub member, and a spring-urged latching dog carried by said collar for cooperation with said notch.

3. In a prosthetic elbow, an upper arm portion and a forearm portion, a pivotal connection between said arm portions, counter-balancing spring mechanism connected respectively to said upper arm portion and said forearm portion for movement about the axis of said pivotal connection, and including a spring, said spring mechanism including a hub member connected to one of said portions and a casing member connected to the other of said portions, the outer end of said spring having a connection to said casing member, and the inner end of said spring having a connection to said hub member, one of said connections comprising a one-way releasable drive connection positioned to resist unwinding of said spring with reference to said forearm portion, latch means on said other arm portion for holding the casing member against movement under the influence of said spring, said one-way releasable connection permitting free rotation of the inner end of said spring upon release of said latch means.

References Cited in the file of this patent
UNITED STATES PATENTS

| | | |
|---|---|---|
| 2,626,398 | Grindle | Jan. 27, 1953 |
| 3,018,097 | Johansson | Jan. 23, 1962 |